United States Patent [19]
Best et al.

[11] Patent Number: 5,490,592
[45] Date of Patent: Feb. 13, 1996

[54] TELESCOPING RIGID FRAME AND SCISSOR CONVEYOR

[75] Inventors: John W. Best; Bob K. Flippo; James D. Walker; Gary D. Carter, all of Jonesboro, Ark.

[73] Assignee: Northstar Industries, Inc., Jonesboro, Ark.

[21] Appl. No.: 349,268

[22] Filed: Dec. 5, 1994

[51] Int. Cl.$^6$ ................................................. B65G 21/14
[52] U.S. Cl. ........................................................... 198/812
[58] Field of Search ................................... 198/588, 812

[56] References Cited

U.S. PATENT DOCUMENTS

| | | | |
|---|---|---|---|
| 2,576,217 | 11/1951 | Eggleston | 198/812 X |
| 2,815,849 | 12/1957 | Zumbrunnen | 198/812 |
| 2,826,290 | 3/1958 | Barski | 198/812 |
| 3,294,216 | 12/1966 | Girardi | 198/812 |
| 3,596,785 | 8/1971 | Weatherford | 198/812 |
| 4,260,053 | 4/1981 | Onodera | 198/812 |
| 4,852,712 | 8/1989 | Best | 193/35 TE |
| 5,224,584 | 7/1993 | Best et al. | 198/782 |

FOREIGN PATENT DOCUMENTS

| | | | |
|---|---|---|---|
| 0372130 | 5/1973 | U.S.S.R. | 198/812 |
| 1407861 | 7/1988 | U.S.S.R. | 198/812 |

*Primary Examiner*—James R. Bidwell
*Attorney, Agent, or Firm*—Kilpatrick & Cody; James L. Ewing, IV; Scott T. Weingaertner

[57] ABSTRACT

Telescoping rigid frame/scissor conveyors. Such conveyors are formed of a plurality of telescoping frame segments which may be positioned at any number of desired nested/unnested configurations. The frame segments bear a lazy tong or scissors conveyor structure which assures uniform roller spacing, and rollers positioned at one height along the conveyor rather than at different heights for each frame segment. Counterintuitively, the increased structural complexity is more than outweighed by the benefits resulting from the uniformly positioned rollers of a uniform height, which are thus adapted to convey articles in a reliable and jam-free fashion unlike previous expandable rigid frame conveyors. Conveyors according to the present invention may contain automatic locks to prevent overextension, powered rollers and motive devices for automatic and reliable extension and retraction.

19 Claims, 3 Drawing Sheets

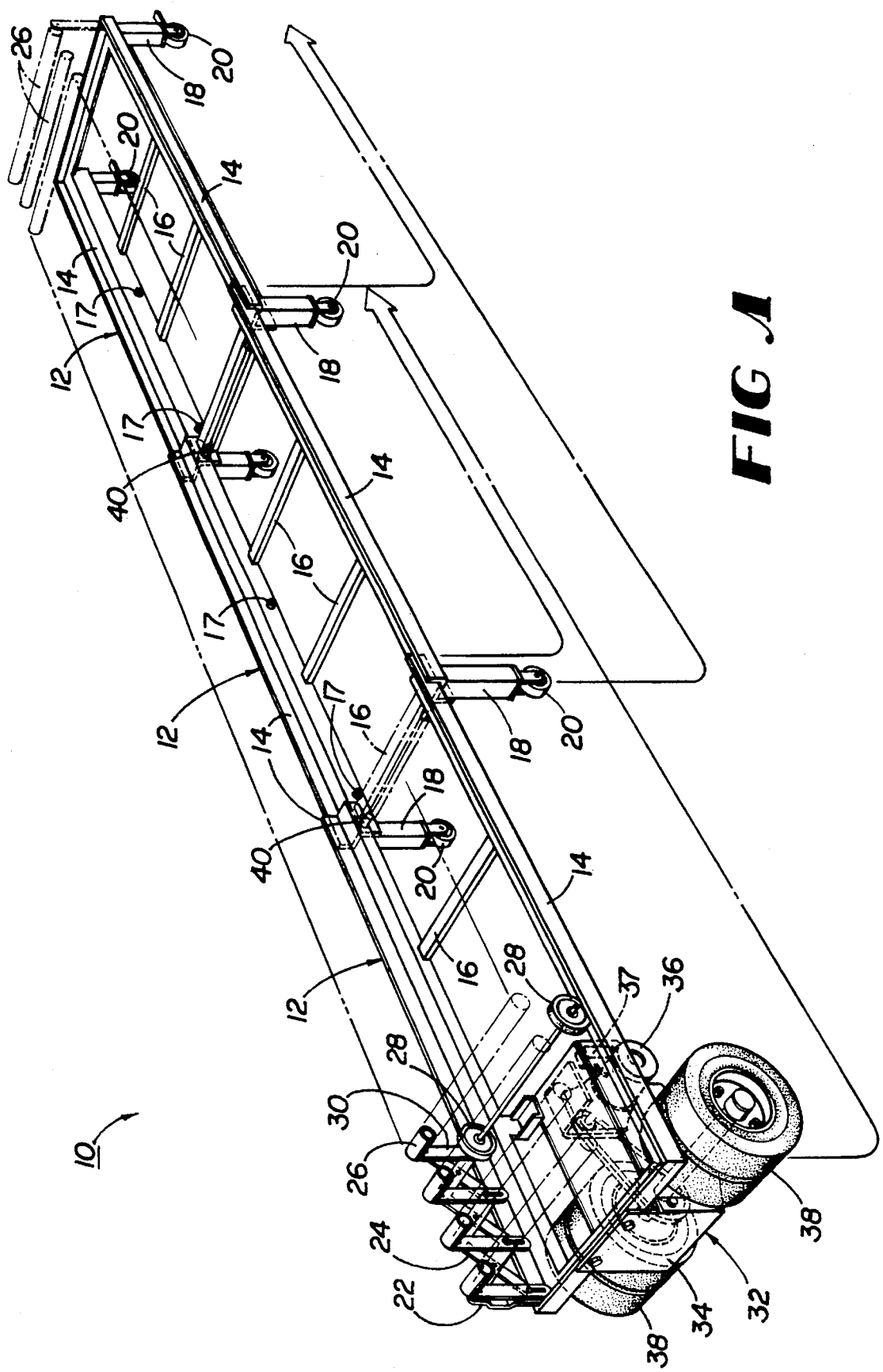

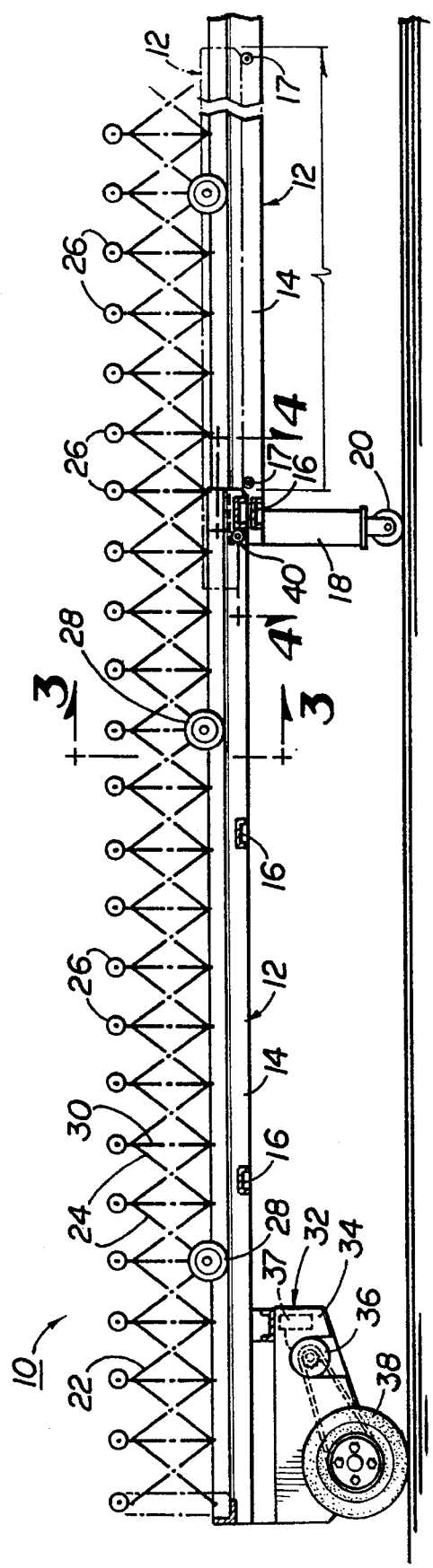

TELESCOPING RIGID FRAME AND SCISSOR CONVEYOR

The present invention relates to conveyors which provide a telescoping rigid frame structure which supports a lazy tong conveyor structure. The structure is adapted to bear heavy loads without sacrificing flexibility in accommodating various desired lengths while maintaining uniform roller separation and height.

BACKGROUND OF THE INVENTION

Roller conveyors, whether rigid frame or of lazy tong structure, are conventional. For instance, U.S. Pat. No. 4,852,712 issued Aug. 1, 1989 to Best entitled "Conveyor" discloses an extensible lazy tong conveyor. U.S. Pat. No. 5,224,584 issued Jul. 6, 1993 to Best, et al. entitled "Expandable Powered Conveyors" discloses power conveyors in which the power units are located external to the rollers and connected to them via a number of chains or belts. U.S. patent application No. 08/022,012 to Best, et al. filed Feb. 24, 1993 entitled "Controllably Powered Roller Conveyors" discloses powered lazy tong conveyors in which the power units are located within the rollers. All of these patent documents are incorporated by this reference.

Additionally, various forms of rigid frame roller and skate wheel conveyors have been used for many years for various purposes. In the past, however, in the event a rigid frame conveyor needed to be extensible, the rollers in one frame segment which could telescope into another frame segment must be positioned at a different height than the rollers in adjacent segments, in order for nesting to be possible. Such variations in height may cause conveyor jams as articles such as boxes drop from one segment to another and their corners become lodged between rollers. Accordingly, conventional resolution has been to include non-roller transitions in the form of short ramps which allow the articles on the conveyor to slide from one level of roller to another level of roller on another segment. Even measures such as this cannot avoid jamming ultimately, however, because the distance between the end of the ramp and the rollers on the lower level is variable and prone to catching box corners.

Additionally, recent ergonomic requirements, occupational health and safety requirements, and greater concern for the welfare of workers have created the need for expandable conveyors to operate in a powered, automatic and easily controllable fashion. Not only must the conveyor contain reliable power means for causing it to extend and retract, but it must also include limit and delimit switches in order to avoid overextension and for safety concerns.

SUMMARY OF THE INVENTION

The present invention provides counterintuitive structures for accommodating the need for a reliable expandable conveyor which bears heavy loads of the type previously accommodated only by rigid frame conveyors, but at the same time maintains the rollers at a constant height and constant spacing for more reliable and less jamming-prone conveyance of articles (among other purposes). The structures include a number of rigid frame segments formed of channels and positioned upon legs that feature casters or rollers. The segments telescope with respect to one another as, for example, the channels telescope into one another. The channels also bear rollers which support an expandable lazy tong conveyor structure which thus rides atop the telescoping frame segments. Although this conveyor structure appears at first blush to be inordinantly complex, duplicative and redundant, it has been found that the additional considerable advantages brought about by consistent height rollers which are also disposed at consistent distances from one another by virtue of the lazy tong structure, more than outweigh any structural complexity.

One or more frame segments may include a motive structure which may contain a motor connected to a wheel or wheels for powering the frame segments into nested and unnested configurations.

Automatic locking mechanisms may prevent the frame segments from overextending with respect to one another, and limit switches control operation of the motive units for automatic shutdown at predetermined nested and unnested positions.

It is accordingly an object of the present invention to provide an expandable conveyor for bearing heavy loads but which maintains the rollers at a uniform height and distance relative to one another via a lazy tong structure.

It is an additional object of the present invention to provide expandable conveyors which may be automatically extended and retracted with respect to one another.

It is another object of the present invention to provide conveyors which contain automatic locks for reducing the chances of overextension.

Other objects, features and advantages of the present invention will become apparent with respect to the remainder of this document.

BRIEF DESCRIPTION OF THE DRAWINGS

FIG. 1 is a perspective view of a first embodiment of conveyors according to the present invention.

FIG. 2 is a cross-sectional view, schematic, of conveyors of FIG. 1.

FIG. 3 is a cross-sectional view of Section 3/3 of FIG. 2.

FIG. 4 is a cross-sectional view of Section 4/4 of FIG. 2.

DETAILED DESCRIPTION OF THE DRAWINGS

Figure 5:
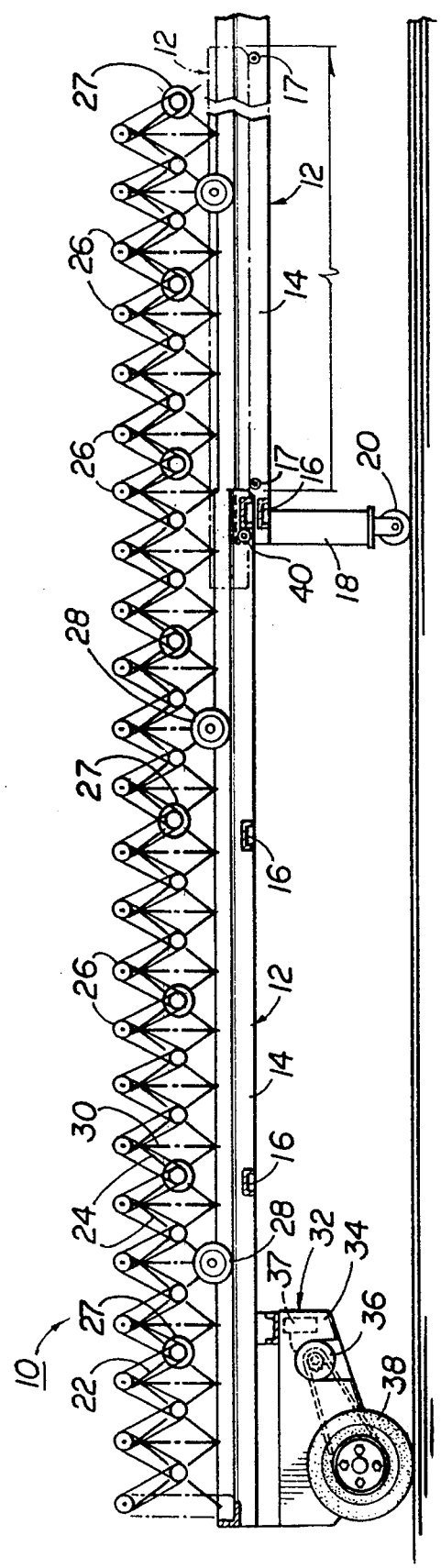
FIG. 5 is a cross-sectional view, schematic, of a second embodiment of conveyors according to the present invention.

FIG. 1 shows a first embodiment of conveyor 10 according to the present invention. Conveyor 10 includes a number of frame segments 12 which are adapted to telescope or nest relative to one another. As an example, as shown in FIG. 1, each frame segment includes a pair of channels 14 such as Z-channels or L-channels which are connected to each other via braces or other linking members of desired length in order to form a desired width of conveyor. The channels 14 and/or linking members 16 connect to at least one pair of support legs 18 which may be formed of desired channel or other structural material and extend substantially vertically from the channel 14 and/or linking member 16. Each support leg 18 is connected to at least one suitable roller or caster 20, which may be conventional and may contain a brake.

Channels 14 of successive frame segments 12 are disposed, as by linking members 16, to allow channels 14 of one frame segment 12 to nest within channels 14 of an adjacent frame segment 12. This relationship is shown in FIGS. 1 and 3. Accordingly, the frame segments 12 may be nested or telescoped into one another according to any desired scheme, such as to allow them to be nested substantially completely (although complete nesting is not a requirement, and the structure need not be formed to allow substantially complete nesting). Coupled to each channel 14 of successive frame segments 12 are one or more segment support or frame rollers 17, which allow successive channels 14 to be connected such that they may move relative to one another in sliding fashion. In addition to permitting smoother relative motion of successive channels 14, frame rollers 17 may absorb at least some of the vertical load placed on a conveying mechanism supported by the frame segments 12.

Positioned atop frame supports 12 is a lazy tong conveyor structure 22. The conveyor structure 22 is formed in conventional lazy tong conveyor structure fashion as by scissor members 24, most of which are connected at their top, mid-segment and bottom portions to other scissor members 24 via bolts, rivets or any other desired fastener. The top connections may be formed of axles for rollers 26 as disclosed in the above-referenced patents, or as otherwise desired. At least some of the bottom connections, or other portions of the lazy tong conveyor structure 22 are connected to tracking wheels 28 which support the lazy tong conveyor structure 22 and ride in the channels 14 of the frame segments 12. The lazy tong conveyor structure 22 may contain vertical members 30 which support rollers 26 and/or tracking wheels 28 and which provide greater strength in the structure. The lazy tong structure 22 accordingly is adapted to extend and retract coextensively with nesting and unnesting of frame segments 12. Beneficially, the expansion and retraction of the lazy tong conveyor structure 22 always accommodates uniform spacing of the rollers 26, and they are maintained at a single level. These characteristics are distinguishable from earlier conveyors, in which rollers connected more directly to frame segments 12 would need to be positioned at different heights for nesting to occur and, in any event, would be spaced other than uniformally as discontinuities occur between one segment and the next.

One or more frame segments 12 may contain a motive unit 32 for assisting in nesting and unnesting. Motive unit 32 includes a frame 34 which carries a motor 36 of desired power and size requirements. The motor 36 is connected to one or more wheels 38, as by chain or drive belt as conventionally desired in order to couple motor 36 to wheels 38. Motor 36 is controlled by a controller circuit 37, which responds to limits which is as required for preventing overextension of frame segments 12, and which allows automatic, reliable and intuitive nesting and unnesting of conveyor 10.

One or more frame segments 12 may also contain a lock 40 for preventing overextension of frame segments 12 relative to one another and undesired movements during use. The locks 40 may be, for example, as shown in FIG. 4 in which a spring loaded lug 42 with beveled extremity 44 slides into an opening in an adjacent frame roller channel for the locking position in order to prevent overextension. However, when nesting is required, the frame segment pushes in the opposite direction against the beveled extremity 44 to force the lug 42 into its retracted position. Multiple openings may obviously be employed in the cooperating frame segment 12 as desired for accommodating predetermined lengths of conveyor; alternatively, the locks may be used simply for preventing overextension beyond a point at which the frame segments 12 would lose structural cooperation.

Rollers 26 may be powered internally or externally as disclosed in the above-referenced U.S. patent documents. For example, in FIG. 1, rollers 26 are powered by commercially available internal power units (not visible in this view, and hence unnumbered). In the embodiment of the present invention shown in FIG. 5, on the other hand, rollers 26 are powered by any conventional external power units 27. They may be powered by any other desirable means as well.

The foregoing has been provided for purposes of illustration and explanation of a preferred embodiment according to the present invention. Other structures, modifications of the disclosed structure, and derivative structures may be prepared and used without departing from the scope or spirit of the present invention.

What is claimed is:

1. An expandable conveyor, comprising:
   a. A plurality of frame segments, each comprising:
      (1) at least one pair of legs, each leg including at least one wheel;
      (2) a pair of channels connected to the legs, each channel dimensioned to receive and nest with channels from adjacent frame segments, so that the frame segments may be telescoped into one another;
      (3) at least one linking member connecting the channels;
   b. a lazy tongs conveyor structure disposed on the frame segments, comprising;
      (1) a pair of expandable lazy tong structures, each connected to a plurality of rollers adapted to be received by the channels of the frame segments so that each lazy tong structure rides atop a channel of a frame segment; and
      (2) a plurality of conveyor rollers, each connecting an upper connection in a lazy tong structure to a corresponding upper connection in the other lazy tong structure in the pair; the lazy tongs conveyor structure adapted to ride atop the frame structure in order to expand as the frame segments are unnested and contract as the frame segments are nested, but at any desired length of the conveyor, to function as an expandable roller conveyor.

2. A conveyor according to claim 1 further comprising a plurality of power units, each of which is connected to at least one conveyor roller, for powering the conveyor.

3. A conveyor according to claim 1 further comprising a motive unit positioned on one frame segment of the conveyor and comprising:
   a. a motive unit frame connected to the frame segment;
   b. at least one wheel connected to the motive frame unit; and
   c. a motor connected to the wheel which is adapted to be actuated in order to cause the frame segments of the conveyor to nest or unnest and thus to contract or extend the conveyor.

4. A conveyor according to claim 2 in which the power units are located within the rollers.

5. A conveyor according to claim 2 in which the power units are located external to the rollers and are connected to the rollers via drive belts.

6. A conveyor according to claim 1 in which each frame segment contains at least one frame segment lock which moves to the locked position as the frame segment an another adjacent nested frame segment are transitioned to a substantially unnested position.

7. A conveyor according to claim 6 in which the frame segment locks automatically move to the unlock position as the conveyor transitions toward a nested position from a substantially unnested position.

8. A conveyor according to claim 1, further comprising a plurality of frame rollers coupled to the channels for permitting the channels to be moved relative to one another in sliding fashion.

9. An expandable conveyor, comprising:
   a. A plurality of frame segments, each comprising:
      (1) at least one pair of legs, each leg including at least one wheel;
      (2) a pair of channels connected to the legs, each channel dimensioned to receive and nest with channels from adjacent frame segments, so that the frame segments may be telescoped into one another;
      (3) at least one linking member connecting the channels;
   b. a lazy tongs conveyor structure disposed on the frame segments, comprising;
      (1) a pair of expandable lazy tong structures, each connected to a plurality of rollers adapted to be received by the channels of the frame segments so that each lazy tong structure rides atop a channel of a frame segment; and
      (2) a plurality of conveyor rollers, each connecting an upper connection in a lazy tong structure to a corresponding upper connection in the other lazy tong structure in the pair; and
   c. a motive unit positioned on one frame segment of the conveyor and comprising:
      (1) a motive unit frame connected to the frame segment;
      (2) at least one wheel connected to the motive frame unit; and
      (3) a motor connected to the wheel which is adapted to be actuated in order to cause the frame segments of the conveyor to nest or unnest and thus to contract or extend the conveyor.

10. A conveyor according to claim 9 in which the motive unit contains a plurality of wheels, at least one of which is connected to the motor, and further comprising an automatic control means for actuating and deactuating the motor when the conveyor reaches a predetermined nested and unnested position.

11. A conveyor according to claim 9 further comprising a plurality of power units attached to the lazy tongs structure and each to at least one roller, for powering the conveyor.

12. A conveyor according to claim 11 in which the power units are located within the rollers.

13. A conveyor according to claim 9 in which at least one frame segment includes at least one frame segment lock which actuates automatically when a corresponding frame segment becomes positioned substantially in an unnested position with respect to the frame segment containing the lock.

14. A conveyor according to claim 13 in which the lock automatically unlocks as the two segments transition toward a mutually nested configuration.

15. An expandable conveyor, comprising:
   a. A plurality of frame segments, each comprising:
      (1) at least one pair of legs, each leg including at least one wheel;
      (2) a pair of channels connected to the legs, each channel dimensioned to receive and nest with channels from adjacent frame segments, so that the frame segments may be telescoped into one another;
      (3) at least one linking member connecting the channels;
   b. a lazy tongs conveyor structure disposed on the frame segments, comprising;
      (1) a pair of expandable lazy tong structures, each connected to a plurality of rollers adapted to be received by the channels of the frame segments so that each lazy tong structure rides atop a channel of a frame segment; and
      (2) a plurality of conveyor rollers, each connecting an upper connection in a lazy tong structure to a corresponding upper connection in the other lazy tong structure in the pair; and
   c. at least one lock connected to at least one of the frame segments, which lock automatically locks as the frame segment and an adjacent frame segment are positioned in a substantially unnested configuration.

16. A conveyor according to claim 15 in which the locks automatically lock as the frame segments transition toward a nested configuration.

17. A conveyor according to claim 15 further comprising a motive unit positioned on one frame segment of the conveyor and comprising:
   a. a motive unit frame connected to the frame segment;
   b. at least one wheel connected to the motive frame unit; and
   c. a motor connected to the wheel which is adapted to be actuated in order to cause the frame segments of the conveyor to nest or unnest and thus to contract or extend the conveyor.

18. A conveyor according to claim 15 further comprising a plurality of power units, each of which is connected to the lazy tong conveyor structure and to at least one roller, for powering the conveyor.

19. A conveyor according to claim 18 in which the power units are located inside the conveyor rollers.

* * * * *

UNITED STATES PATENT AND TRADEMARK OFFICE
CERTIFICATE OF CORRECTION

PATENT NO. : 5,490,592

DATED : February 13, 1996

INVENTOR(S) : John W. Best; Bob K. Flippo; James D. Walker; Gary D. Carter

It is certified that error appears in the above-indentified patent and that said Letters Patent is hereby corrected as shown below:

Column 1, line 4, delete "provide" and insert --include--.

Signed and Sealed this

Twenty-sixth Day of November 1996

Attest:

BRUCE LEHMAN

*Attesting Officer*  *Commissioner of Patents and Trademarks*